(12) United States Patent
Shimizu et al.

(10) Patent No.: US 12,278,567 B2
(45) Date of Patent: Apr. 15, 2025

(54) COMMUNICATION APPARATUS AND SEMICONDUCTOR DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Takaaki Shimizu, Tokyo (JP); Jun Ihara, Kitamoto Saitama (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 334 days.

(21) Appl. No.: 17/941,681

(22) Filed: Sep. 9, 2022

(65) Prior Publication Data

US 2023/0283187 A1    Sep. 7, 2023

(30) Foreign Application Priority Data

Mar. 7, 2022 (JP) ................................ 2022-034687

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H04B 5/22* (2024.01)

(58) Field of Classification Search
CPC ...... H02M 3/33523; H02M 1/08; H04B 5/22; H04B 1/04; H04L 25/026; H04L 25/08
See application file for complete search history.

(56) References Cited

U.S. PATENT DOCUMENTS 8,847,503 B2   9/2014   Chang et al.
10,224,969 B2  3/2019   Takeda et al.
(Continued)

FOREIGN PATENT DOCUMENTS

JP   2009060272 A    3/2009
JP   2014-207668 A  10/2014
(Continued)

OTHER PUBLICATIONS

Notice of Reasons for Refusal (Office Action) dated Jan. 28, 2025 in corresponding Japanese Patent Application No. 2022-034687 with English Translation (6 pages).

*Primary Examiner* — David S Huang
(74) *Attorney, Agent, or Firm* — Kim & Stewart LLP

(57) ABSTRACT

According to the present embodiment, a main pulse signal generation circuit generates a first main pulse signal corresponding to rising of a logic signal, and a second main pulse signal corresponding to falling thereof. A sub pulse signal generation circuit performs at least either a first generation process of generating a first sub pulse signal corresponding to the first main pulse signal at predetermined intervals, or a second generation process of generating a second sub pulse signal corresponding to the second main pulse signal at predetermined intervals after a predetermined time from generation of the second main pulse signal. An output circuit outputs at least any of the first main pulse signal, the second main pulse signal, the first sub pulse signal, and the second sub pulse signal. The output circuit stops outputting at least either the first sub pulse signal or the second sub pulse signal.

18 Claims, 15 Drawing Sheets

(51) Int. Cl.
*H04B 5/00* (2024.01)
*H04B 5/22* (2024.01)

(56) References Cited

U.S. PATENT DOCUMENTS

| | | |
|---|---|---|
| 10,367,485 B2 | 7/2019 | Nagase et al. |
| 10,637,451 B2 | 4/2020 | Soga |
| 2008/0159360 A1* | 7/2008 | Florence ............ H04L 25/0268 375/211 |
| 2011/0032744 A1 | 2/2011 | Ohmori et al. |
| 2022/0294672 A1* | 9/2022 | Gaalaas ............. H04L 25/0272 |

FOREIGN PATENT DOCUMENTS

| | | |
|---|---|---|
| JP | 2016046723 A | 4/2016 |
| JP | 2016174346 A | 9/2016 |
| JP | 2017-147538 A | 8/2017 |
| JP | 2019-102822 A | 6/2019 |
| JP | 2020-031301 A | 2/2020 |
| WO | 2009128486 A1 | 10/2009 |

* cited by examiner

COMMUNICATION APPARATUS AND SEMICONDUCTOR DEVICE

CROSS-REFERENCE TO RELATED APPLICATIONS

This application is based upon and claims the benefit of priority from the prior Japanese Patent Application No. 2022-034687, filed on Mar. 7, 2022, the entire contents of which are incorporated herein by reference.

FIELD

Embodiments of the present invention relate to a communication apparatus and a semiconductor device.

BACKGROUND

A communication apparatus that transmits signals via an AC coupling element is generally known. However, there is a risk of an erroneous operation in a receiving circuit of the communication apparatus due to signal noise and the like.

DETAILED DESCRIPTION

According to an embodiment of the present invention, a communication apparatus comprises a transmitting circuit. The transmitting circuit comprises an encoder. The encoder comprises a main pulse signal generation circuit, a sub pulse signal generation circuit, and an output circuit. The main pulse signal generation circuit generates a first main pulse signal in response to rising of a logic signal, and a second main pulse signal in response to falling thereof. The sub pulse signal generation circuit performs at least either a first generation process of generating a first sub pulse signal corresponding to the first main pulse signal at predetermined intervals after a predetermined time from generation of the first main pulse signal, or a second generation process of generating a second sub pulse signal corresponding to the second main pulse signal at predetermined intervals after a predetermined time from generation of the second main pulse signal. The output circuit stops outputting at least either the first sub pulse signal or the second sub pulse signal.

Embodiments of the present invention will be explained below with reference to the accompanying drawings. In the following embodiments, while characteristic configurations and operations of a communication apparatus and a semiconductor device are mainly described, configurations and operations omitted in the following descriptions may also be included in the communication apparatus and the semiconductor device.

First Embodiment

Figure 1:
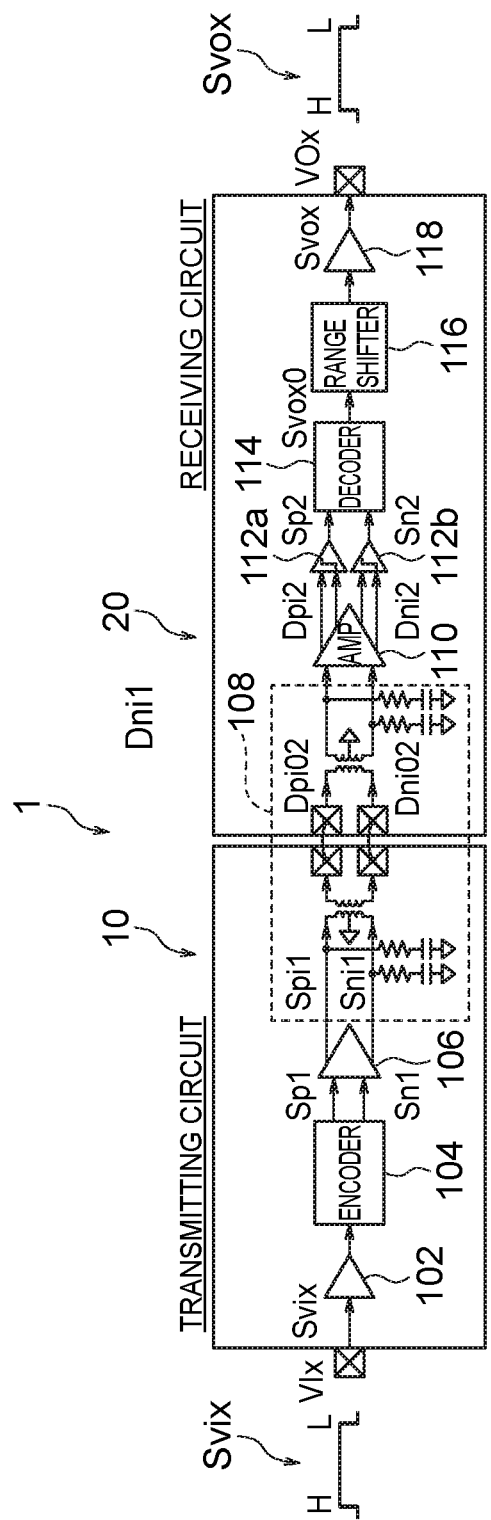
FIG. 1 is a block diagram illustrating a configuration example of a communication apparatus.
Figure 2:
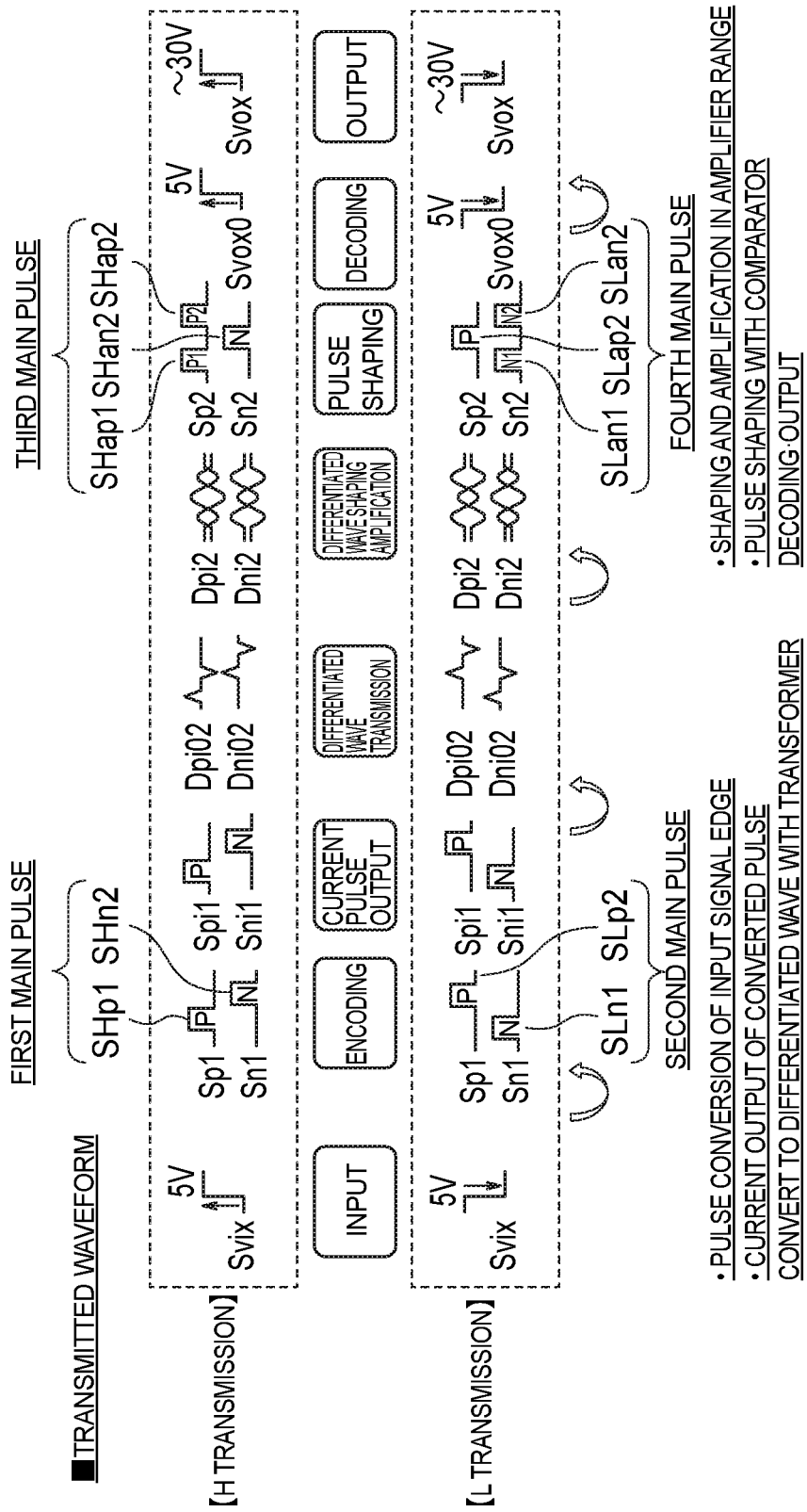
FIG. 2 is a diagram schematically illustrating signals output from each circuit.

A configuration example of a communication apparatus 1 is explained using FIGS. 1 and 2. FIG. 1 is a block diagram illustrating the configuration example of the communication apparatus 1. As illustrated in FIG. 1, the communication apparatus 1 is, for example, a digital isolator and is an apparatus for transmitting a digital logic signal in a state in which a transmission side and a reception side are electrically isolated from each other. The digital isolator is a semiconductor device that can be formed by application of a highly versatile semiconductor process such as a CMOS (Complementary Metal-Oxide Semiconductor) process.

The communication apparatus 1 includes, for example, a transmitting circuit (TX) 10 on a primary side and a receiving circuit (RX) 20 on a secondary side, that are galvanically isolated from each other. That is, the communication apparatus 1 includes an input buffer 102, an encoder 104, a converter 106, an AC coupling element 108, an amplifier (AMP) 110, a plurality of comparators 112a and 112b, a decoder 114, a range shifter 116, and an output buffer 118. A signal input terminal VIx and an input signal Svix, and a signal output terminal VOx and an output signal Svox are also illustrated in FIG. 1.

FIG. 2 is a diagram schematically illustrating signals output from each of the circuits. The vertical axis represents a signal level and the horizontal axis represents a time. Signals Svix, Sp1, Sn1, Spi1, Sni1, Dpi02, Dni02, Dpi2, Dni2, Sp2, Sn2, Svox0, and Svox correspond to signals in FIG. 1, respectively. The signals Svix, Sp1, Sn1, Dpi2, Dni2, Sp2, Sn2, Svox0, and Svox are voltage signals and the signals Spi1, Sni1, Dpi02, and Dni02 are current signals.

The signal Svix is, for example, a logic signal of a rectangular wave and is input to the input terminal VIx (see FIG. 1). H transmission indicates an example of transmission of main signals in changing of the signal Svix from a low level to a high level. L transmission indicates an example of transmission of main signals in changing of the signal Svix from a high level to a low level. That is, a state in which the signal Svix changes to the signals Sp1, Sn1, Spi1, Sni1, Dpi02, Dni02, Dpi2, Dni2, Sp2, Sn2, Svox0, and Svox in chronological order is illustrated. For example, subscripts p and P indicate a positive side being a first pole side and subscripts n and N indicate a negative side being a second pole side different from the first pole side.

More specifically, the signal Svix is input from the signal input terminal VIx to the input buffer 102. The signal Svix is composed of a high-level signal of, for example, 5 volts (V) and a low-level signal of, for example, 0 (zero) V. In the signal Svix, the high-level signal of 5 V corresponds to "1" and the low-level signal of 0 V corresponds to "0". In this manner, high-level signals correspond to "1" and low-level signals correspond to "0" in the present embodiment.

The input buffer 102 outputs the input signal Svix of a rectangular wave to the encoder 104 while maintaining the form of a rectangular wave. The encoder 104 generates pulse signals Sp1 and Sn1 in response to the input signal Svix of a rectangular wave. This encoder 104 generates first main pulse signals SHp1 and SHn2 that are a first combination of predetermined pulse signals as main signals in response to rising of a logic signal of a rectangular wave. For example, the encoder 104 generates the main pulse signal SHp1 prior to the main pulse signal SHn2 in response to rising of a logic signal of a rectangular wave.

On the other hand, the encoder 104 generates second main pulse signals SLn1 and SLp2 that are a second combination of predetermined pulse signals as main signals in response to falling of a logic signal of a rectangular wave. For example, the encoder 104 generates the main pulse signal SLn1 prior to the main pulse signal SLp2 in response to falling of a logic signal of a rectangular wave.

In this manner, the encoder 104 brings the pulse signal Sp1 on the p side (positive side) to a high level prior to the pulse signal Sn1 on the n side (negative side) in response to rising of a logic signal of a rectangular wave. On the other hand, the encoder 104 brings the pulse signal Sn1 on the n side to a high level prior to the pulse signal Sp1 on the p side in response to falling of a logic signal of a rectangular wave. It suffices that the combinations of predetermined pulse signals differ between rising of a logic signal of a rectangular wave and falling of a logic signal of a rectangular wave and each of the combinations is not limited to that of two pulse signals. For example, one pulse signal, three pulse signals, or four pulse signals may be used.

The encoder 104 also generates first sub pulse signals Shp1 and Shn2 or second sub pulse signals Sln1 and Slp2 (all not illustrated) for refreshing of the decoder 114 in addition to the main pulse signals SHp1, SHn2, SLn1, and SLp2. The encoder 104 outputs the generated pulse signals to the converter 106. Details of the encoder 104 will be described later. In the present embodiment, the first main pulse signals SHp1 and SHn2 and the first sub pulse signals Shp1 and Shn2 are described as having same forms, respectively, and the second main pulse signals SLn1 and SLp2 and the second sub pulse signals Sln1 and Slp2 are described as having same forms, respectively. However, the forms are not limited thereto. The first sub pulse signals Shp1 and Shn2 or the second sub pulse signals Sln1 and Slp2 are generated to perform so-called refresh processing of the decoder 114 described later.

The converter 106 converts the pulse signals Sp1 and Sn1 for the voltage into pulse signals Spi1 and Sni1 for the current and outputs the converted pulse signals Spi1 and Sni1 to the AC coupling element 108. The AC coupling element 108 transmits the signals generated by the encoder 104 to the decoder 114. The AC coupling element 108 is an insolation micro transformer and, for example, transmits differentiated 35 waves Dpi02 and Dni02 according to the pulse signals Spi1 and Sni1 to the receiving circuit 20 on the secondary side while ensuring galvanic isolation. The AC coupling element 108 outputs the differentiated waves Dpi02 and Dni02 to the amplifier 110. While being the isolation micro transformer in the present embodiment, the AC coupling element 108 is not limited thereto. For example, the AC coupling element 108 may be an insolation micro capacitor that is galvanically isolated.

The amplifier 110 amplifies the differentiated waves Dpi02 and Dni02 to output signals Dpi2 and Dni2 to each of the comparators 112a and 112b. That is, the signals Dpi2 and Dni2 are differential signals of amplified three waves.

The comparators 112a and 112b perform pulse signal shaping of the signals Dpi2 and Dni2 and output resultant pulse signals Sp2 and Sn2 to the decoder 114, respectively. More specifically, the comparators 112a and 112b generate third main pulse signals SHap1, SHan2, and SHap2 corresponding to the first main pulse signals SHp1 and SHn2 by pulse signal shaping. Similarly, the comparators 112a and 112b generate fourth main pulse signals SLan1, SLap2, and SLan2 corresponding to the second main pulse signals SLn1 and SLp2 by pulse signal shaping.

The comparators 112a and 112b also generate third sub pulse signals Shap1, Shan2, and Shap2 corresponding to the first sub pulse signals Shp1 and Shn2 by pulse signal shaping. Similarly, the comparators 112a and 112b generate fourth sub pulse signals Slan1, Slap2, and Slan2 corresponding to the second sub pulse signals Sln1 and Slp2 by pulse signal shaping. The decoder 114 decodes a logic signal Svox0 of a rectangular wave according to the pulse signals Sp2 and Sn2. That is, the third sub pulse signals Shap1, Shan2, and Shap2 are pulse signals equivalent to the third main pulse signals SHap1, SHan2, and SHap2. Similarly, the fourth sub pulse signals Slan1, Slap2, and Slan2 are pulse signals equivalent to the fourth main pulse signals SLan1, SLap2, and SLan2. While the third sub pulse signals Shap1, Shan2, and Shap2 and the third main pulse signals SHap1, SHan2, and SHap2 are equivalent pulse signals in the present embodiment, these are not limited thereto. Similarly, while the fourth sub pulse signals Slan1, Slap2, and Slan2 and the fourth main pulse signals SLan1, SLap2, and SLan2 are equivalent pulse signals, these are not limited thereto.

The decoder 114 outputs the logic signal Svox0 of a rectangular wave to the range shifter 116. The decoder 114 maintains the output value at a high level for the third main pulse signals SHap1, SHan2, and SHap2 and the third sub pulse signals Shap1, Shan2, and Shap2 corresponding to rising of the logic signal of a rectangular wave. Accordingly, the output of the high-level signal is maintained even when the third sub pulse signals Shap1, Shan2, and Shap2 corresponding to the rising are input many times.

On the other hand, the decoder 114 maintains the output value at a low level for the fourth main pulse signals SLan1, SLap2, and SLan2, and the fourth sub pulse signals Slan1, Slap2, and Slan2 corresponding to falling of the logic signal of a rectangular wave. Accordingly, the output of the low-level signal is maintained even when the fourth sub pulse signals Slan1, Slap2, and Slan2 corresponding to the falling are input many times.

For example, the third sub pulse signals Shap1, Shan2, and Shap2 are inserted between the first main pulse signals SHp1 and SHn2 corresponding to rising of the input signal Svix of a rectangular wave and the second main pulse signals SLn1 and SLp2 corresponding to falling thereof. In this case, even when the third sub pulse signals Shap1, Shan2, and Shap2 are inserted, the form of the logic signal Svox0 of a rectangular wave is maintained at the high level without being changed until the second main pulse signals SLn1 and SLp2 are input.

Similarly, the fourth sub pulse signals Slan1, Slap2, and Slan2 are inserted between the second main pulse signals SLn1 and SLp2 corresponding to falling thereof and the first main pulse signals SHp1 and SHn2 corresponding to rising thereof. In this case, even when the fourth sub pulse signals Slan1, Slap2, and Slan2 are inserted, the form of the logic signal Svox0 of a rectangular wave is maintained at the low level without being changed until the first main pulse signals SHp1 and SHn2 are input.

The decoder 114 includes, for example, a flip-flop and sets the flip-flop to a predetermined value each time the third main pulse signals SHap1, SHan2, and SHap2, the third sub pulse signals Shap1, Shan2, and Shap2, the fourth main pulse signals SLan1, SLap2, and SLan2, or the fourth sub pulse signals Slan1, Slap2, and Slan2 are input. That is, when the third sub pulse signals Shap1, Shan2, and Shap2 or the fourth sub pulse signals Slan1, Slap2, and Slan2 are inserted, the decoder 114 sets the flip-flop to a predetermined value according to the sub pulse signals. In this case, even when the flip-flop is set to the predetermined value, the decoder 114 maintains the high-level output value until the fourth main pulse signals SLan1, SLap2, and SLan2 are input, in a case in which the third main pulse signals SHap1, SHan2, and SHap2 are input. Similarly, even when the flip-flop is set to the predetermined value, the decoder 114 maintains the low-level output value until the third main pulse signals SHap1, SHan2, and SHap2 are input, in a case in which the fourth main pulse signals SLan1, SLap2, and SLan2 are input.

In this manner, the decoder 114 repeats the operation of setting the flip-flop to a predetermined value according to the third sub pulse signals Shap1, Shan2, and Shap2 or the fourth sub pulse signals Slan1, Slap2, and Slan2 and repeats so-called refresh processing. Accordingly, for example, even when the output value of the flip-flop is inverted due to signal noise or the like, the output is corrected to a correct value. Details of the decoder 114 will be described later using FIGS. 13 to 15.

The range shifter 116 shifts the range of the logic signal Svox0, for example, from 5 V to 30 V to output the logic signal Svox to the output buffer 118. The output buffer 118 outputs the logic signal Svox from the terminal VOx in a state in which the output waveform of the logic signal Svox is maintained.

Figure 3:
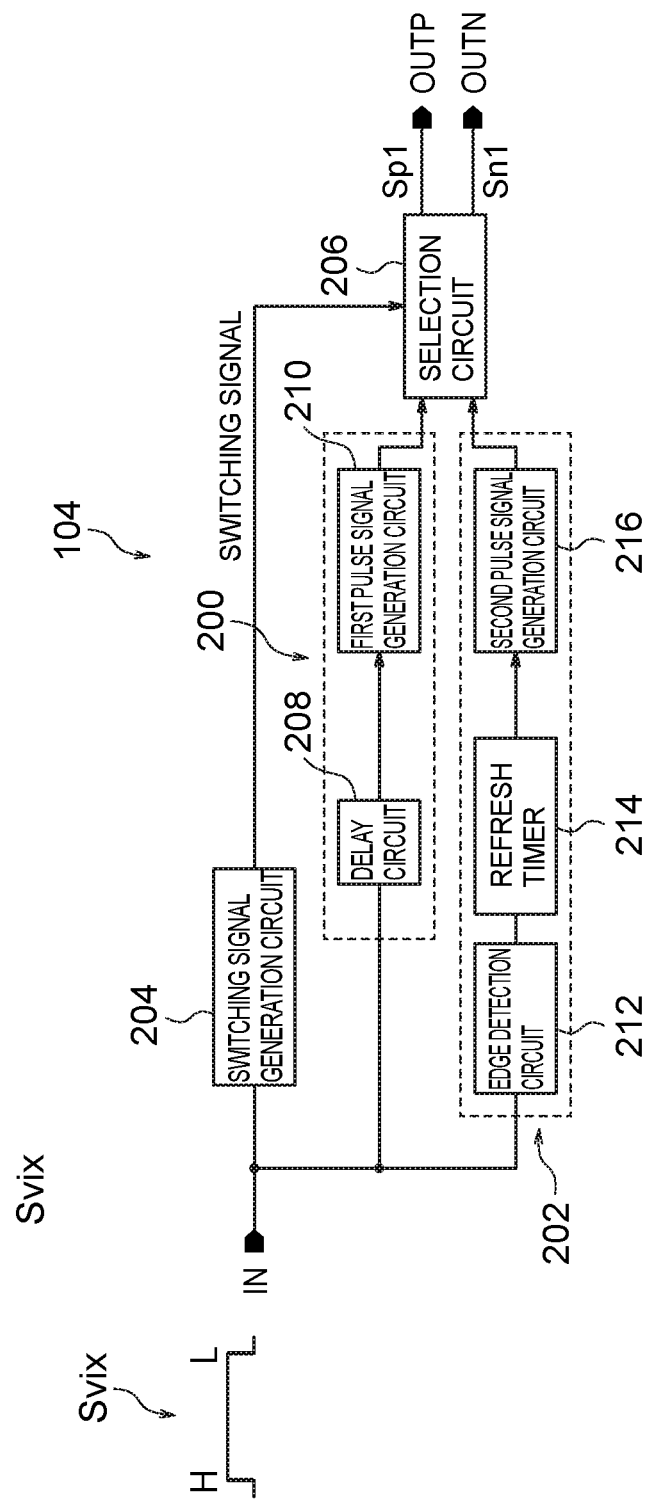
FIG. 3 is a block diagram illustrating a configuration example of an encoder.

FIG. 3 is a block diagram illustrating a configuration example of the encoder 104. The encoder 104 includes a main pulse signal generation circuit 200, a sub pulse signal generation circuit 202, a switching signal generation circuit 204, and a selection circuit 206.

The main pulse signal generation circuit 200 generates the first main pulse signals SHp1 and SHn2 corresponding to rising of the input signal Svix of a rectangular wave and the second main pulse signals SLn1 and SLp2 corresponding to falling of the input signal Svix of a rectangular wave. That is, the main pulse signal generation circuit 200 includes a delay circuit 208 and a first pulse signal generation circuit 210. Details of the main pulse signal generation circuit 200 will be described later.

The sub pulse signal generation circuit 202 generates the first sub pulse signals Shp1 and Shn2 corresponding to the first main pulse signals SHp1 and SHn2 between the first main pulse signals SHp1 and SHn2 and the second main pulse signals SLn1 and SLp2. The sub pulse signal generation circuit 202 also generates the second sub pulse signals Sln1 and Slp2 corresponding to the second main pulse signals SLn1 and SLp2 between the second main pulse signals SLn1 and SLp2 and the first main pulse signals SHp1 and SHn2.

More specifically, the sub pulse signal generation circuit 202 repeatedly generates the first sub pulse signals Shp1 and Shn2 at predetermined intervals, a predetermined time after rising of the input signal Svix is detected. On the other hand, the sub pulse signal generation circuit 202 repeatedly generates the second sub pulse signals Sln1 and Slp2 at predetermined intervals, a predetermined time after falling of the input signal Svix is detected. The sub pulse signal generation circuit 202 includes an edge detection circuit 212, a refresh timer 214, and a second pulse signal generation circuit 216. Details of the sub pulse signal generation circuit 202 will be also described later.

The switching signal generation circuit 204 outputs, for example, a switching signal select_pulse_sig as a high-level signal during a time corresponding to a main pulse selection period when rising or falling of the input signal Svix is detected. Meanwhile, the switching signal generation circuit 204 assumes a time other than the main pulse selection period as a sub pulse signal selection period and outputs the switching signal select_pulse_sig as a low-level signal. Details of the switching signal generation circuit 204 will be also described later.

The selection circuit 206 is, for example, a multiplexer and selects the output signal of the main pulse signal generation circuit 200 to output the selected signal when a high-level signal is input as the switching signal select_pulse_sig. On the other hand, the selection circuit 206 selects the output signal of the sub pulse signal generation circuit 202 to output the selected signal when a low-level signal is input as the switching signal select_pulse_sig. Accordingly, the selection circuit 206 outputs the sub pulse signals and stops outputting of the main pulse signals during a period in which the switching signal select_pulse_sig is a low-level signal. On the other hand, the selection circuit 206 outputs the main pulse signals and stops outputting of the sub pulse signals during a period in which the switching signal select_pulse_sig is a high-level signal. The selection circuit 206 according to the present embodiment corresponds to an output circuit.

Figure 4:
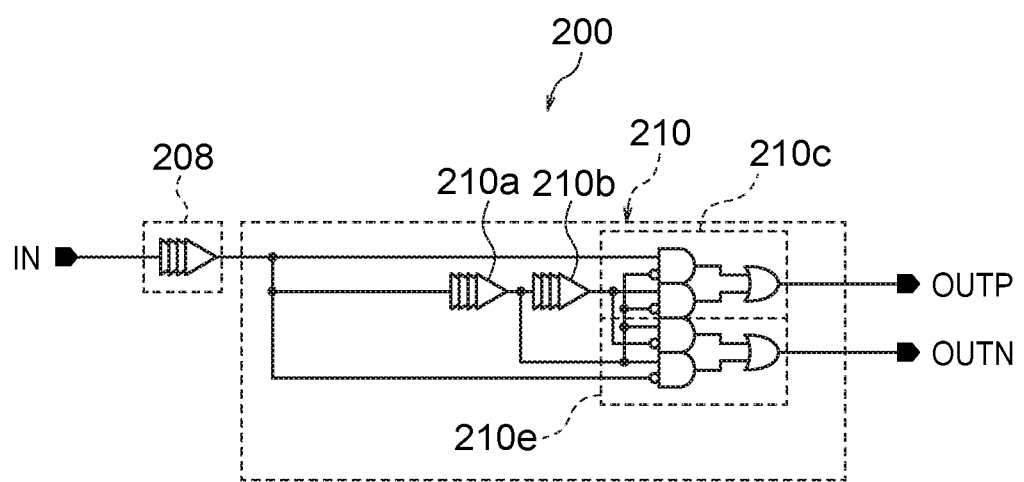
FIG. 4 is a diagram illustrating a configuration example of a main pulse signal generation circuit.

Details of the encoder 104 are explained below using FIGS. 4 to 8B. FIG. 4 is a diagram illustrating a configuration example of the main pulse signal generation circuit 200. The main pulse signal generation circuit 200 includes the delay circuit 208 and the first pulse signal generation circuit 210. The first pulse signal generation circuit 210 includes a plurality of delay circuits 210a and 210b, and a plurality of logic circuits 210c and 210e.

Figure 5:
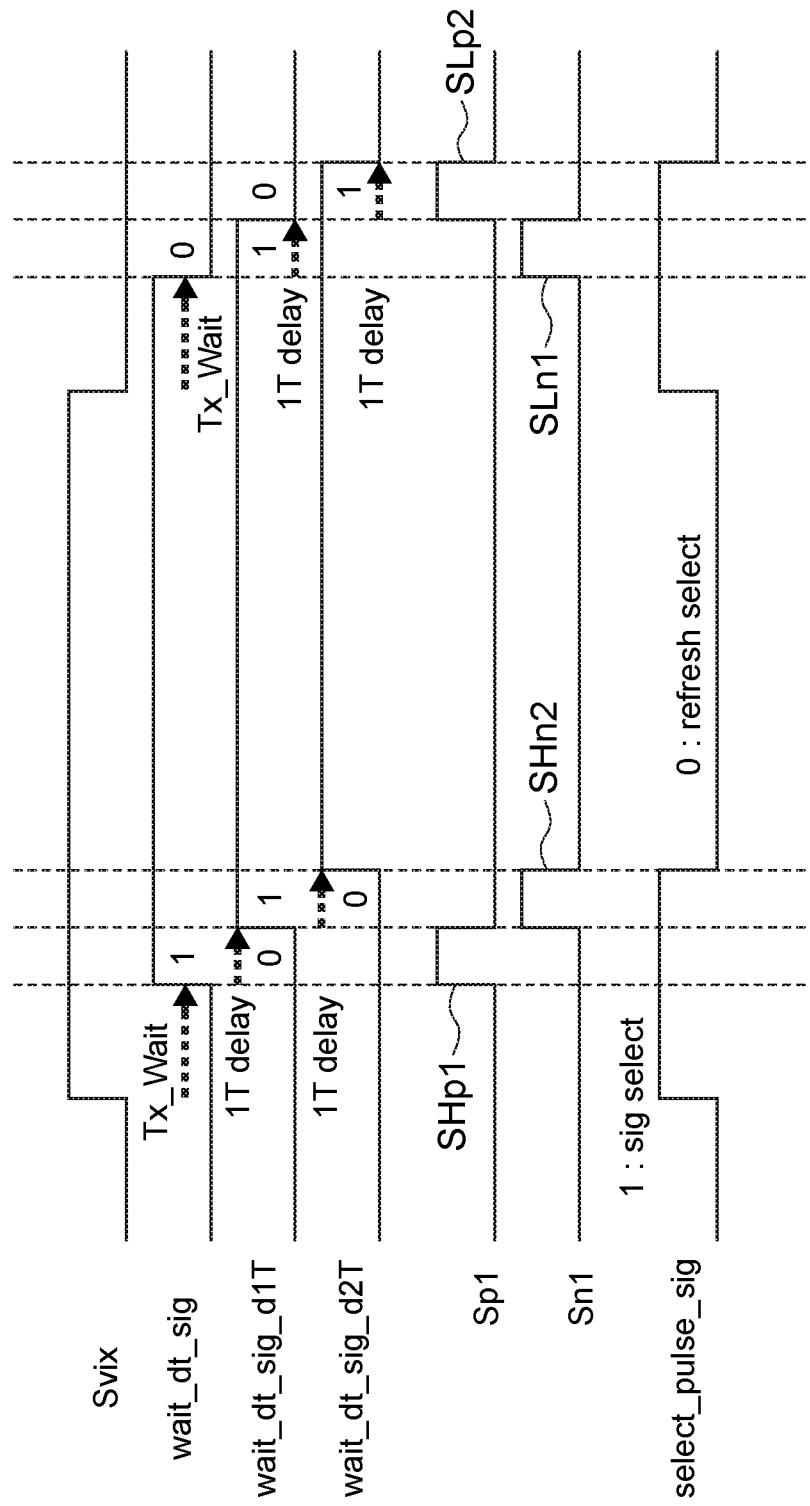
FIG. 5 is a diagram illustrating an example of output signals of the main pulse signal generation circuit.

FIG. 5 is a diagram illustrating an example of output signals of the main pulse signal generation circuit 200. The input signal Svix, an output signal wait_dt_sig of the delay circuit 208, a delayed signal wait_dt_sig_d1T generated by the delay circuit 210a of the first pulse signal generation circuit 210, a delayed signal wait_dt_sig_d2T generated by the delay circuit 210b, and the pulse signals Sp1 and Sn1 are illustrated from the top. The switching signal select_pulse_sig generated by the switching signal generation circuit 204 is also illustrated. The vertical axis represents a signal level and the horizontal axis represents a time. As described above, high-level signals correspond to "1" and low-level signals correspond to "0 (zero)".

The delay circuit 208 is constituted, for example, by series-connecting a plurality of buffers. The delay circuit 208 outputs the output signal wait_dt_sig that is the input signal Svix delayed according to a delay time Tx_Wait. This delay time Tx_Wait is set according to the signal form of the differentiated signals Dpi2 and Dni2. For example, a portion of the differentiated signals Dpi2 and Dni2 at a signal level equal to or lower than a predetermined absolute value is referred to as "footing signal". The delay time Tx_Wait is set, for example, according to the length of the footing signal. For example, when the first main pulse signals SHp1 and SHn2 and the second main pulse signals SLn1 and SLp2 are continuously generated, the footing signals overlap and the pulse signals Sp2 and Sn2 generated by the comparators 112a and 112b are deformed. Therefore, the delay time Tx_Wait is set, for example, to prevent the footing signals from overlapping.

The delay circuit 210a generates the delayed signal wait_dt_sig_d1T by delaying the output signal wait_dt_sig by 1T. The delay circuit 210b generates the delayed signal wait_dt_sig_d2T by further delaying the delayed signal wait_dt_sig_d1T by 1T.

The logic circuit 210c performs a logical operation in accordance with expression (1).

[Formula 1]

$$Sp1=(wait\_dt\_sig\&\sim wait\_dt\_sig\_d1T)|(\sim wait\_dt\_sig\_d1T\&wait\_dt\_sig\_d2T) \quad (1)$$

That is, the logic circuit 210c outputs the pulse signal Sp1 at a high level when the output signal wait_dt_sig is at a high level and the delayed signal wait_dt_sig_d1T is at a low level. That is, the main pulse signal SHp1 is a high-level signal having a time width of 1T from a time point when the delay time Tx_Wait has passed after rising of the input signal Svix.

The logic circuit 210c outputs the pulse signal Sp1 at a high level when the delayed signal wait_dt_sig_d1T is at a low level and the delayed signal wait_dt_sig_d2T is at a high level. That is, the main pulse signal SLp2 is a high-level signal having a time width of 1T from a time point when the delay time Tx_Wait and 1T have passed after falling of the input signal Svix.

The logic circuit 210e performs a logical operation in accordance with expression (2).

[Formula 2]

$$Sn1=(wait\_dt\_sig\_d1T\&\sim wait\_dt\_sig\_d2T)|(\sim wait\_dt\_sig\&wait\_dt\_sig\_d1T) \quad (2)$$

That is, the logic circuit 210e outputs the pulse signal Sn1 at a high level when the delayed signal wait_dt_sig_d1T is at a high level and the delayed signal wait_dt_sig_d2T is at a low level. That is, the main pulse signal SHn2 is a high-level signal having a time width of 1T from a time point when the delay time Tx_Wait and 1T have passed after rising of the input signal Svix.

The logic circuit 210e outputs the pulse signal Sn1 at a high level when the output signal wait_dt_sig is at a low level and the delayed signal wait_dt_sig_d1T is at a high level. That is, the main pulse signal SLn1 is a high-level signal having a time width of 1T from a time point when the delay time Tx_Wait has passed after falling of the input signal Svix.

In this manner, the first pulse signal generation circuit 210 generates the first main pulse signals SHp1 and SHn2 from a time point when the delay time Tx_Wait has passed after rising of the input signal Svix. The first pulse signal generation circuit 210 further generates the second main pulse signals SLn1 and SLp2 from a time point when the delay time Tx_Wait has passed after falling of the input signal Svix.

Figure 6:
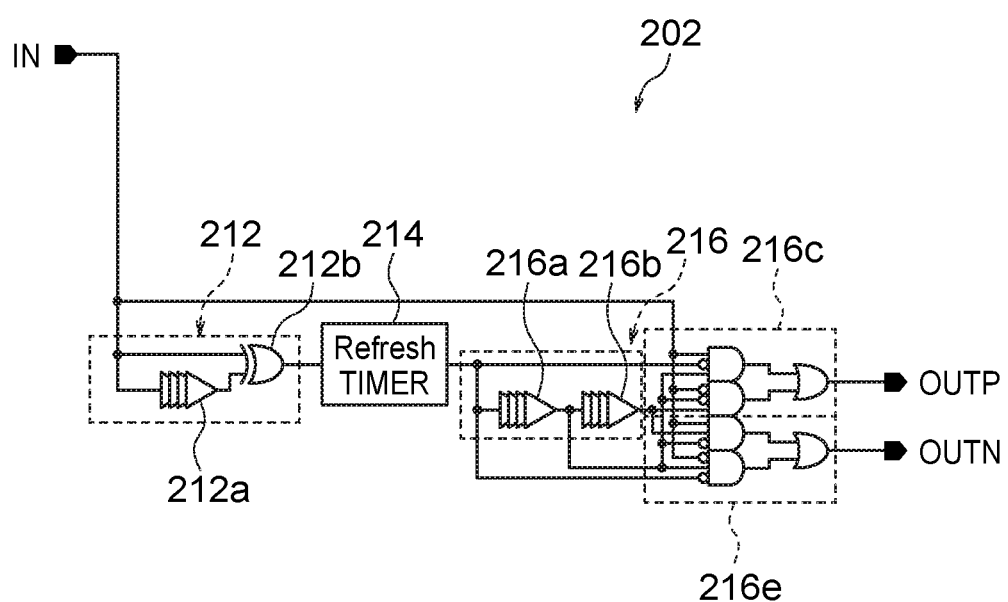
FIG. 6 is a diagram illustrating a configuration example of a sub pulse signal generation circuit.

FIG. 6 is a diagram illustrating a configuration example of the sub pulse signal generation circuit 202. As described above, the sub pulse signal generation circuit 202 includes the edge detection circuit 212, the refresh timer 214, and the second pulse signal generation circuit 216. The edge detection circuit 212 includes, for example, a delay circuit 212a and an exclusive OR circuit 212b. The second pulse signal generation circuit 216 includes a plurality of delay circuits 216a and 216b, and a plurality of logic circuits 216c and 216e.

Figure 7A:
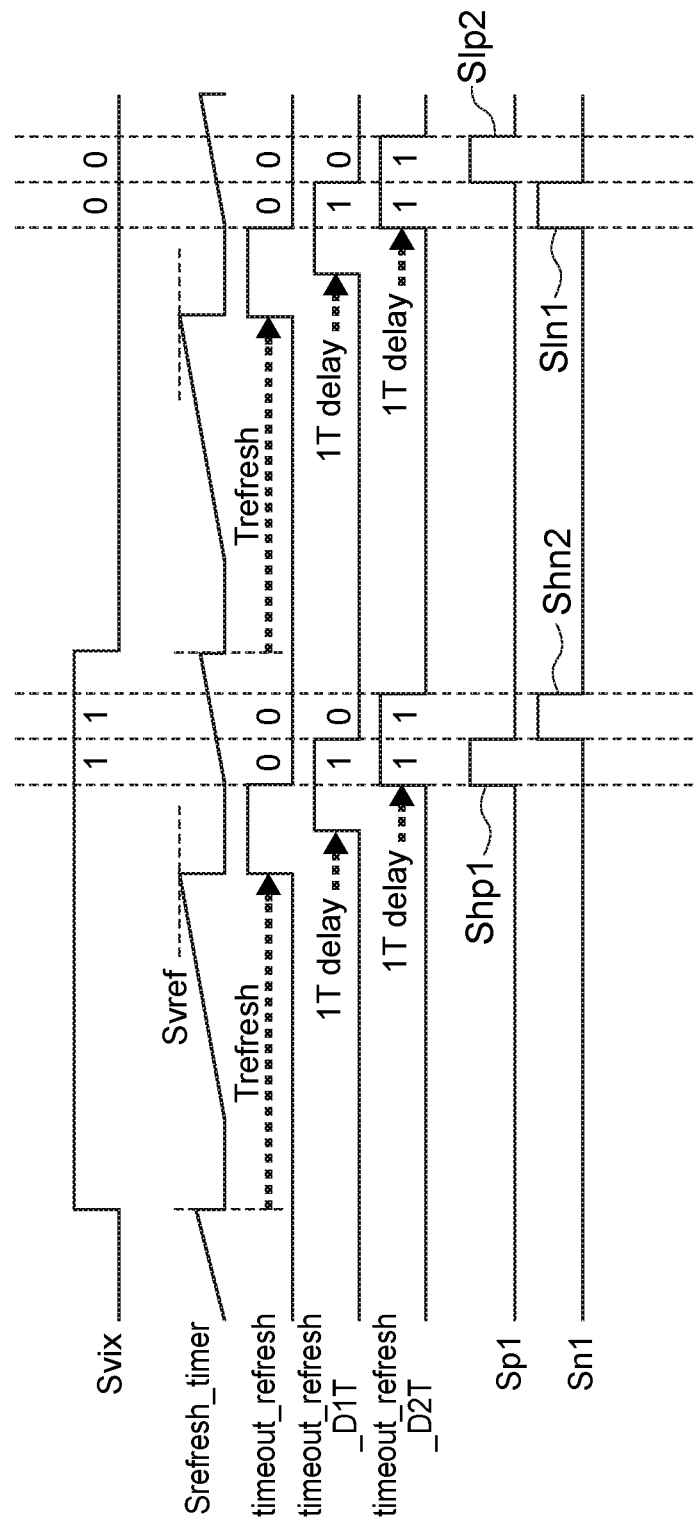
FIG. 7A is a diagram illustrating an example of output signals of the sub pulse signal generation circuit.

FIG. 7A is a diagram illustrating an example of output signals of the sub pulse signal generation circuit 202. The input signal Svix, a generated signal Srefresh_timer in the refresh timer 214, a generated pulse signal timeout_refresh of the refresh timer 214, a delayed signal timeout_refresh_D1T generated by the delay circuit 216a, a delayed signal timout_refresh_D2T generated by the delay circuit 216b, and the pulse signals Sp1 and Sn1 are illustrated from the top. As described above, high-level signals correspond to "1" and low-level signals correspond to "0 (zero)".

As illustrated in FIG. 6, the exclusive OR circuit 212b outputs 1 when the input signals are a combination of 1 and 0 or 0 and 1. That is, the edge detection circuit 212 outputs 1 being a high-level signal at a time when the value of the input signal Svix and the value of the output signal of the delay circuit 212a are different, that is, at a time when a signal corresponding to an edge is input.

The refresh timer 214 includes, for example, a capacitor and repeats charging and discharging of the capacitor from a time point when a high-level signal is input from the edge detection circuit 212, thereby internally generating the generated signal Srefresh_timer. When the signal Srefresh_timer exceeds a predetermined threshold Svref, the refresh timer 214 outputs the pulse signal timeout_refresh having a time width of 2T. In this manner, the refresh timer 214 repeatedly outputs the pulse signal timeout_refresh at predetermined time intervals (Trefresh+2T) from a time point when the edge detection circuit 212 has input a high-level signal. However, the refresh timer 214 internally generates a new generated signal Srefresh_timer when the edge detection circuit 212 detects a next edge. That is, the refresh timer 214 refreshes the capacitor at a time when the edge detection circuit 212 has detected a next edge, and newly repeats charging and discharging of the capacitor.

The delay circuit 216a generates the delayed signal timeout_refresh_D1T by delaying the pulse signal timeout_refresh by 1T. The delay circuit 216 generates the delayed signal timeout_refresh_D2T by delaying the delayed signal timeout_refresh_D1T by 1T.

The logic circuit 216c performs a logical operation in accordance with expression (3).

[Formula 3]

$$Sp1=(\sim timeout\_refresh\&timeout\_refresh\_DT1\&Svix)|(\sim timeout\_refresh\_DT1\&timeout\_refresh\_DT2\&\sim Svix) \quad (3)$$

That is, the logic circuit 216c outputs the pulse signal Sp1 at a high level when the pulse signal timeout_refresh is at a low level, the delayed signal timeout_refresh_D1T is at a high level, and the input signal Svix is at a high level. That is, the sub pulse signal Shp1 is a high-level signal having a time width of 1T from a time point when the delay time Trefresh and 2T have passed after rising of the input signal Svix.

The logic circuit 216c outputs the pulse signal Sp1 at a high level when the delayed signal timeout_refresh_DIT is at a low level, the delayed signal timeout_refresh_D2T is at a high level, and the input signal Svix is at a low level. That is, the sub pulse signal Slp2 is a high-level signal having a time width of 1T from a time point when the delay time Trefresh and 3T have passed after falling of the input signal Svix.

The logic circuit 216e performs a logical operation in accordance with expression (4).

[Formula 4]

$$Sn1=(\sim timeout\_refresh \& timeout\_refresh\_D1T \& \sim Svix)|(\sim timeout\_refresh\_D1T \& timeout\_refresh\_D2T \& Svix) \quad (4)$$

That is, the logic circuit 216e outputs the pulse signal Sn1 at a high level when the delayed signal timeout_refresh_DIT is at a low level, the delayed signal timeout_refresh_D2T is at a high level, and the input signal Svix is at a high level. That is, the sub pulse signal Shn2 is a high-level signal having a time width of 1T from a time point when the delay time Trefresh and 3T have passed after rising of the input signal Svix.

The logic circuit 216e outputs the pulse signal Sn1 at a high level when the pulse signal timeout_refresh is at a low level, the delayed signal timeout_refresh_D1T is at a high level, and the input signal Svix is at a low level. That is, the sub pulse signal Sln1 is a high-level signal having a time width of 1T from a time point when the delay time Trefresh and 2T have passed after falling of the input signal Svix.

In this manner, the sub pulse signal generation circuit 202 repeatedly and alternately generates the first sub pulse signals Shp1 and Shn2 from a time point when the delay time Trefresh and 2T have passed after rising of the input signal Svix. The sub pulse signal generation circuit 202 repeatedly and alternately generates the second sub pulse signals Sln1 and Slp2 from a time point when the delay time Trefresh and 2T have passed after falling of the input signal Svix.

Figure 7B:
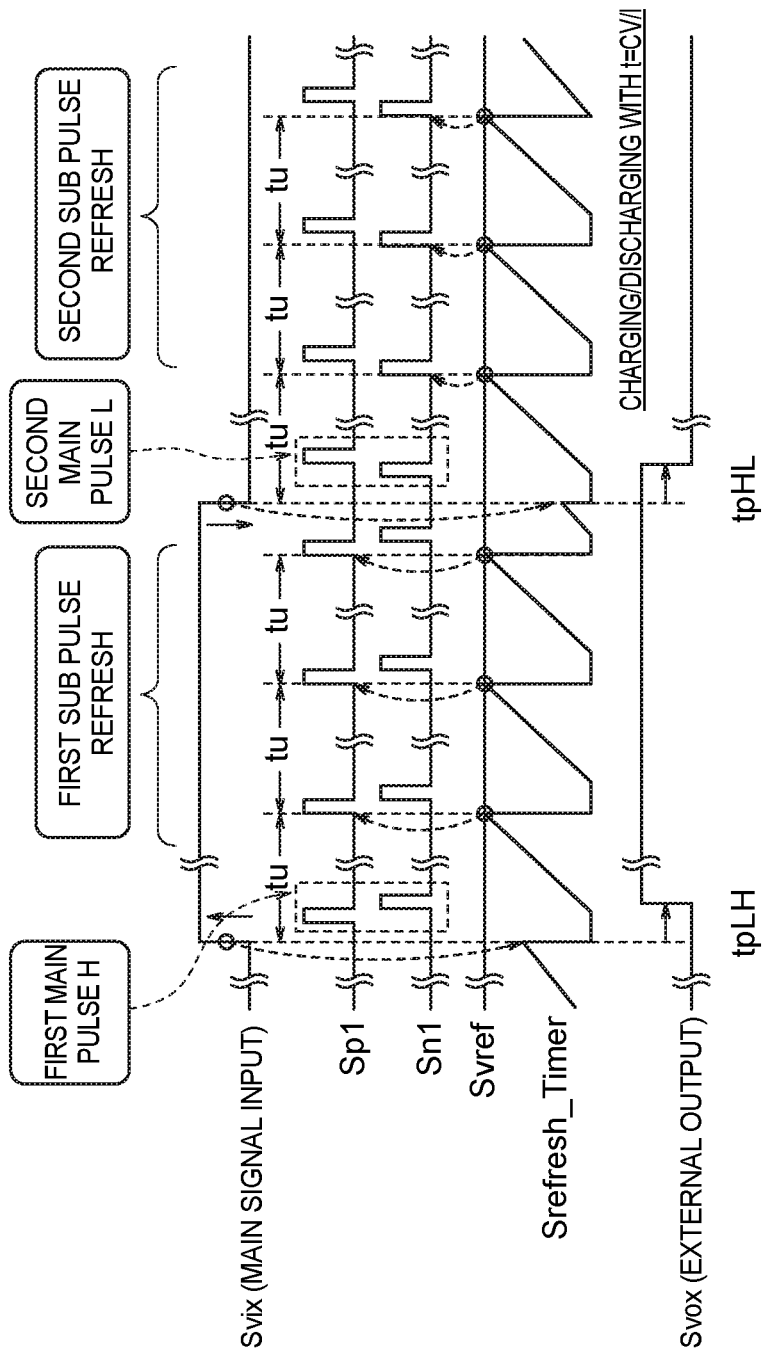
FIG. 7B is a diagram illustrating an example of generation of main pulse signals and sub pulse signals.

FIG. 7B is a diagram illustrating an example of generation of the main pulse signals and the sub pulse signals. The input signal Svix, the pulse signals Sp1 and Sn1, the threshold voltage Svref in the refresh timer 214, the internal signal Srefresh_Timer, and the output signal Svox are illustrated from the top. The vertical axis represents a signal level and the horizontal axis represents a time. The first sub pulse signals are repeatedly generated after the first main pulse signal. Similarly, the second sub pulse signals are repeatedly generated after the second main pulse signal. The output signal Svox is a high-level signal in a same period as that of the input signal Svix with a delay of the delay time tpLH (tpHL).

Figure 8A:
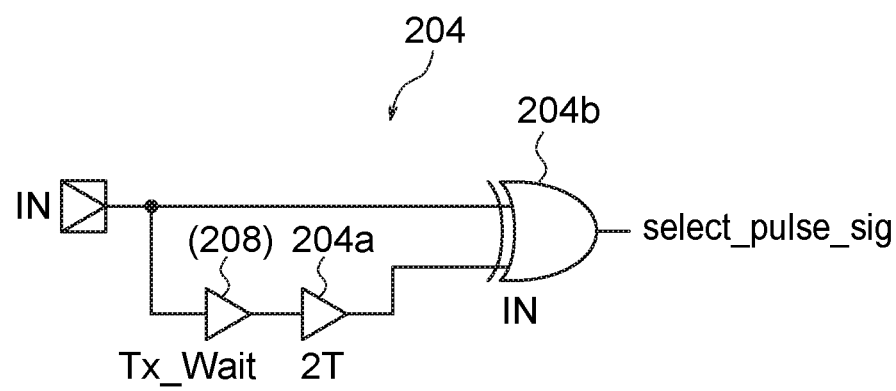
FIG. 8A is a diagram illustrating a configuration example of a switching signal generation circuit.
Figure 8B:
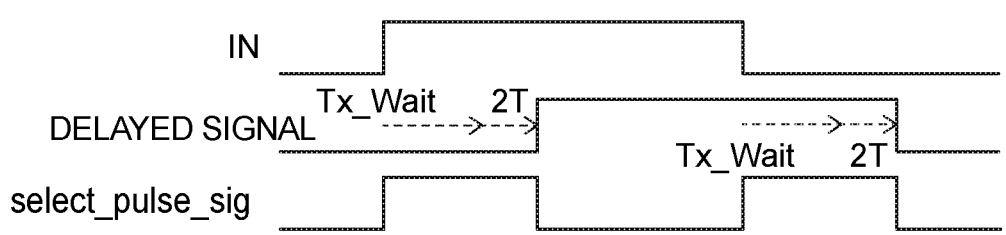
FIG. 8B is a diagram illustrating an example of an output signal of the switching signal generation circuit.

A configuration example of the switching signal generation circuit 204 is explained below using FIGS. 8A and 8B. FIG. 8A is a diagram illustrating a configuration example of the switching signal generation circuit 204. As illustrated in FIG. 8A, the switching signal generation circuit 204 includes delay circuits 208 and 204a and an ExOR circuit (non-identity circuit) 204b. FIG. 8B is a diagram illustrating an example of the output signal of the switching signal generation circuit 204. The input signal Svix, a delayed signal of the delay circuits 208 and 204a, and the switching signal select_pulse_sig output from the ExOR circuit (non-identity circuit) 204b are illustrated from the top. The horizontal axis represents a time. As described above, high-level signals correspond to "1" and low-level signals correspond to "0 (zero)".

As illustrated in FIG. 8B, the delay circuit 208 delays the input signal Svix by Tx_Wait, and the delay circuit 204a further delays the delayed input signal Svix by 2T and outputs the resultant signal to the ExOR circuit (non-identity circuit) 204b. The ExOR circuit (non-identity circuit) 204b generates the switching signal select_pulse_sig with a pulse width of Tx_Wait+2T.

That is, the switching signal generation circuit 204 performs a logical operation in accordance with expression (5).

[Formula 5]

$$select\_pulse\_sig=(Svix \& \sim wait\_dt\_sig\_d2T)| (\sim Svix \& wait\_dt\_sig\_d2T) \quad (5)$$

In this manner, the switching signal generation circuit 204 outputs the selection signal select_pulse_sig at a high level when the input signal Svix is at a high level and the delayed signal wait_dt_sig_d2T is at a low level. The switching signal generation circuit 204 outputs the selection signal select_pulse_sig at a high level when the input signal Svix is at a low level and the delayed signal wait_dt_sig_d2T is at a high level. That is, the selection signal select_pulse_sig is a high-level signal rising with a time width of a delay time (Tx_Wait+2T) after rising or falling of the input signal Svix.

Figure 9:
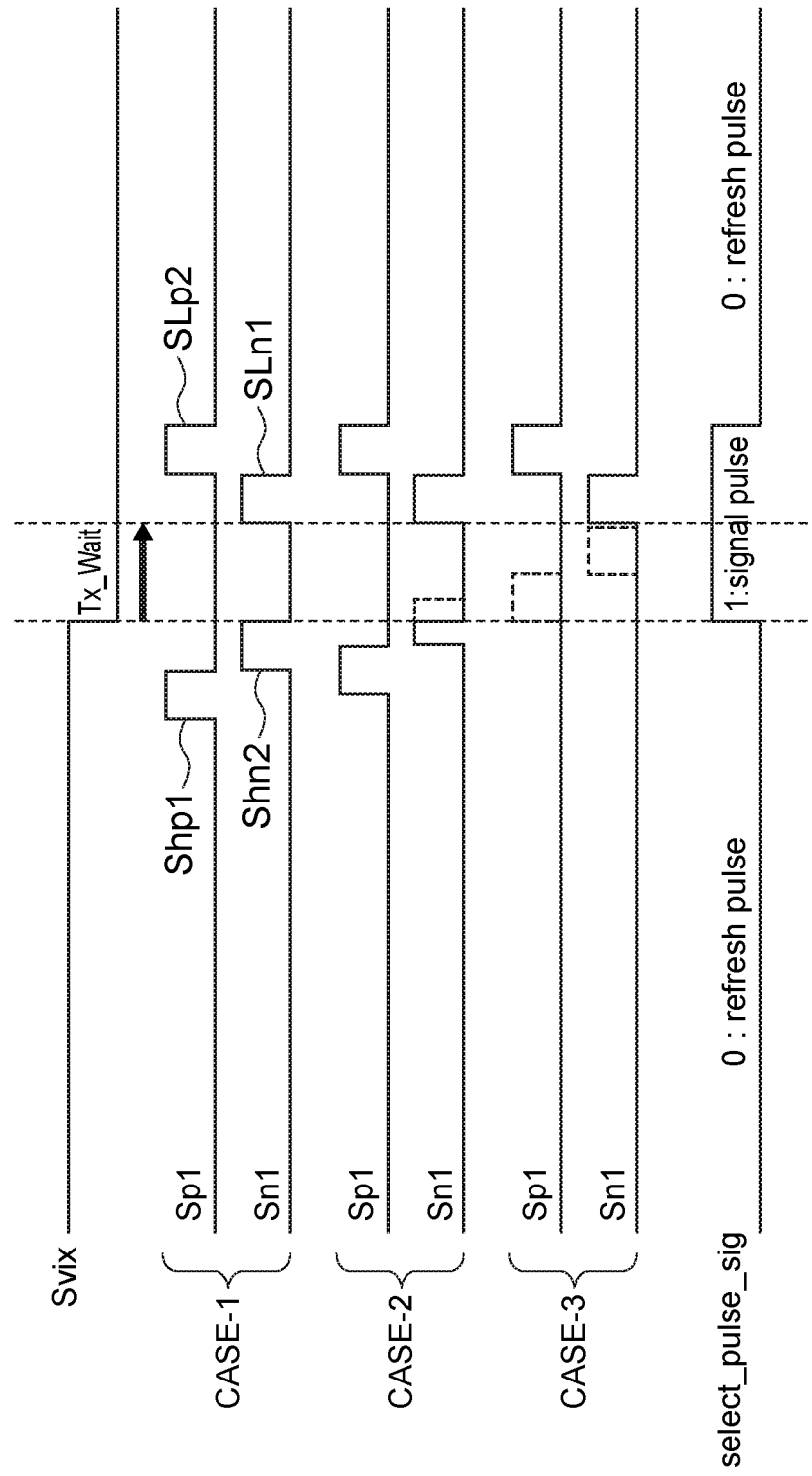
FIG. 9 is a diagram illustrating an example of signal switching in a selection circuit of the encoder.

FIG. 9 is a diagram illustrating an example of signal switching in the selection circuit 206 of the encoder 104. The input signal Svix, the pulse signals Sp1 and Sn1 in a case 1 (CASE-1), the pulse signals Sp1 and Sn1 in a case 2 (CASE-2), the pulse signals Sp1 and Sn1 in a case 3 (CASE-3), and the selection signal select_pulse_sig are illustrated from the top. The horizontal axis represents a time and the vertical axis represents a signal level.

The case 1 is a case in which falling of the input signal Svix occurs at each end of the first sub pulse signals Shp1 and Shn2 described in FIG. 7A. The case 2 is a case in which falling of the input signal Svix occurs at a point in the middle of generation of the first sub pulse signals Shp1 and Shn2. The case 3 is a case in which falling of the input signal Svix occurs at a point immediately before generation of the first sub pulse signals Shp1 and Shn2.

As illustrated in FIG. 9, the selection circuit 206 according to the present embodiment stops outputting of the sub pulse signal generation circuit 202 when the selection signal select_pulse_sig becomes a high level. Accordingly, since the outputting of the sub pulse signal generation circuit 202 is stopped during generation of the first sub pulse signals Shp1 and Shn2 or before the generation thereof as in the cases 2 and 3, influences of the first sub pulse signals Shp1 and Shn2 can be suppressed. In other words, the main pulse signal generation circuit 200 can generate the second main pulse signals SLn1 and SLp2 immediately after the delay time Tx_Wait from occurrence of rising or falling of the input signal Svix (see FIG. 5). In this manner, in the communication apparatus 1 according to the present embodiment, although a time point when rising or falling of the input signal Svix occurs is unknown until the rising or falling of the input signal Svix actually occurs, the main pulse signal generation circuit 200 can generate the second main pulse signals SLn1 and SLp2 without being influenced by the first sub pulse signals Shp1 and Shn2. Similarly, the main pulse signal generation circuit 200 can generate the first main pulse signals SHp1 and SHn2 without being influenced by the second sub pulse signals Sln1 and Slp2.

Figure 10:
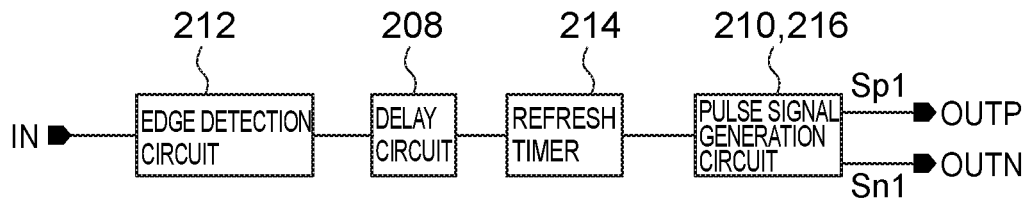
FIG. 10 is a diagram schematically illustrating a configuration of a comparative example not having the selection circuit.

FIG. 10 is a diagram schematically illustrating a configuration of a comparative example not having the selection circuit 206. The configuration of the comparative example does not include the selection circuit 206. Therefore, when a sub pulse signal is being generated at a time point when rising or falling of the input signal Svix occurs, a main pulse signal is generated Tx_Wait after the end of generation of the sub pulse signal to suppress interference between the sub pulse signal and the main pulse signal.

Figure 11:
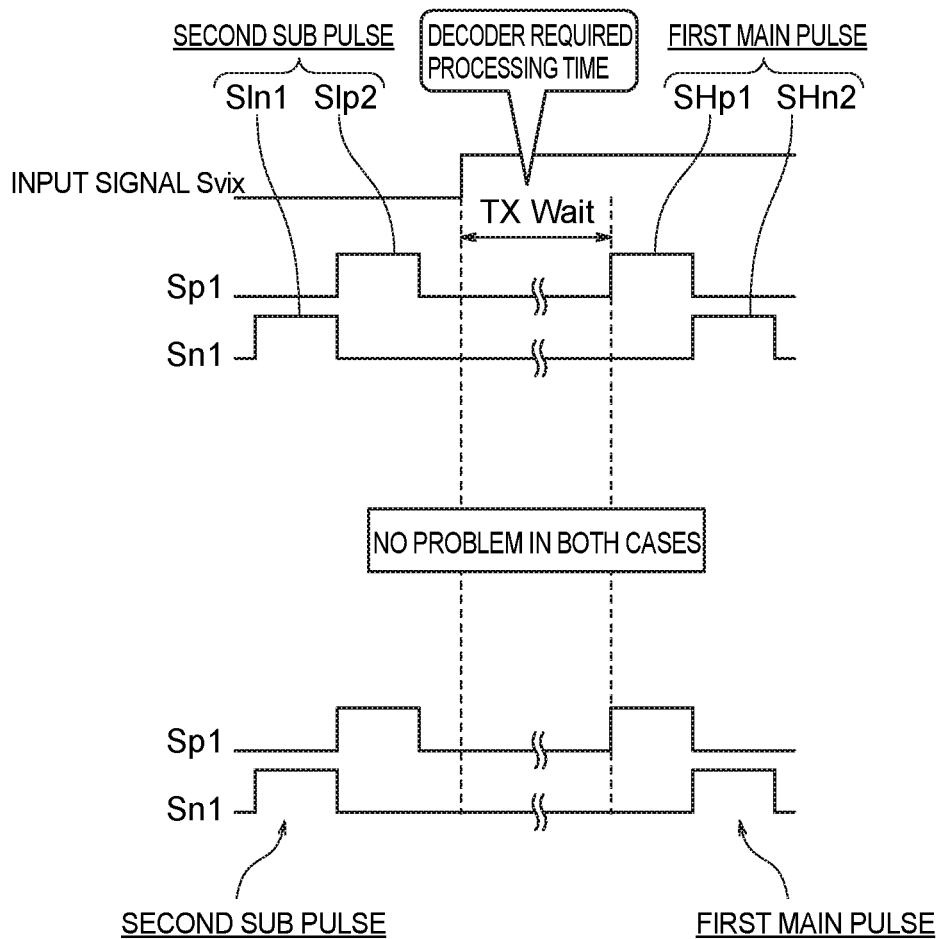
FIG. 11 is a diagram illustrating an operation example in a case in which an input signal rises.

FIG. 11 is a diagram illustrating an operation example in a case in which the input signal Svix rises. The input signal Svix, the pulse signals Sp1 and Sn1 in the comparative example, and the pulse signals Sp1 and Sn1 of the communication apparatus 1 according to the present application are illustrated from the top. The horizontal axis represents a time and the vertical axis represents a signal level. Since the input signal Svix rises in some cases, the second sub pulse signals Sln1 and Slp2 are repeatedly generated.

As illustrated in FIG. 11, when the input signal Svix rises after generation of the second sub pulse signals Sln1 and Slp2, both the cases in the comparative example and the present application are not influenced by the second sub pulse signals Sln1 and Slp2. That is, the first main pulse signals SHp1 and SHn2 can be generated immediately after the period of TX_Wait from the timing of rising of the input signal Svix in the both cases of the comparative example and the present application.

Figure 12:
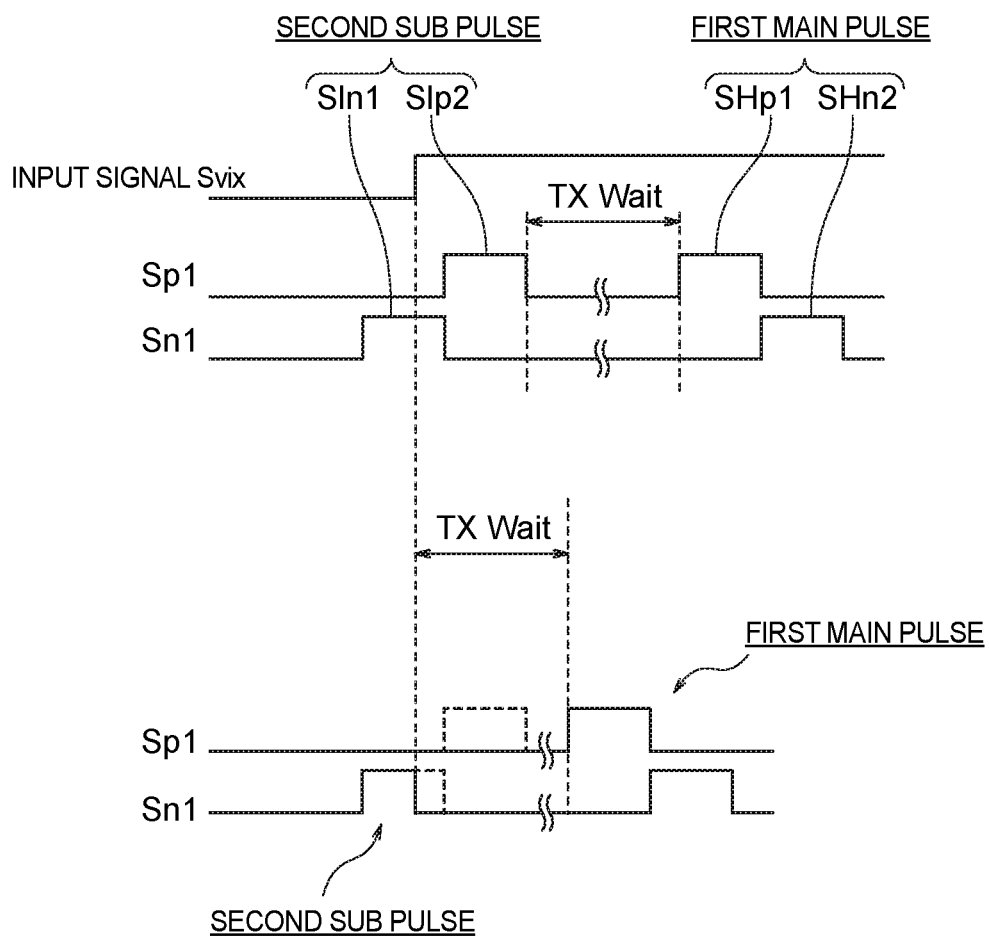
FIG. 12 is a diagram illustrating an operation example in a case in which an input signal rises while sub pulse signals are being generated.

FIG. 12 is a diagram illustrating an operation example in a case in which the input signal Svix rises while the second sub pulse signals Sln1 and Slp2 are being generated. The input signal Svix, the pulse signals Sp1 and Sn1 in the comparative example, and the pulse signals Sp1 and Sn1 of the communication apparatus 1 according to the present application are illustrated from the top. The horizontal axis represents a time and the vertical axis represents a signal level.

As illustrated in FIG. 12, when the input signal Svix rises during generation of the second sub pulse signals Sln1 and Slp2, the second sub pulse signals Sln1 and Slp2 are included during the period of TX_Wait in the comparative example. Accordingly, interference between the second sub pulse signals Sln1 and Slp2 and the first main pulse signals SHp1 and SHn2 occurs in the decoder 114. Therefore, in the comparative example, the period of TX_Wait needs to be further provided after generation of the second sub pulse signals Sln1 and Slp2 ends, which delays the communication. In contrast thereto, in the communication apparatus 1 according to the present application, the process of generating the first main pulse signals SHp1 and SHn2 can be performed without waiting the end of generation of the second sub pulse signals Sln1 and Slp2 because outputting of the second sub pulse signals Sln1 and Slp2 is stopped.

Figure 13:
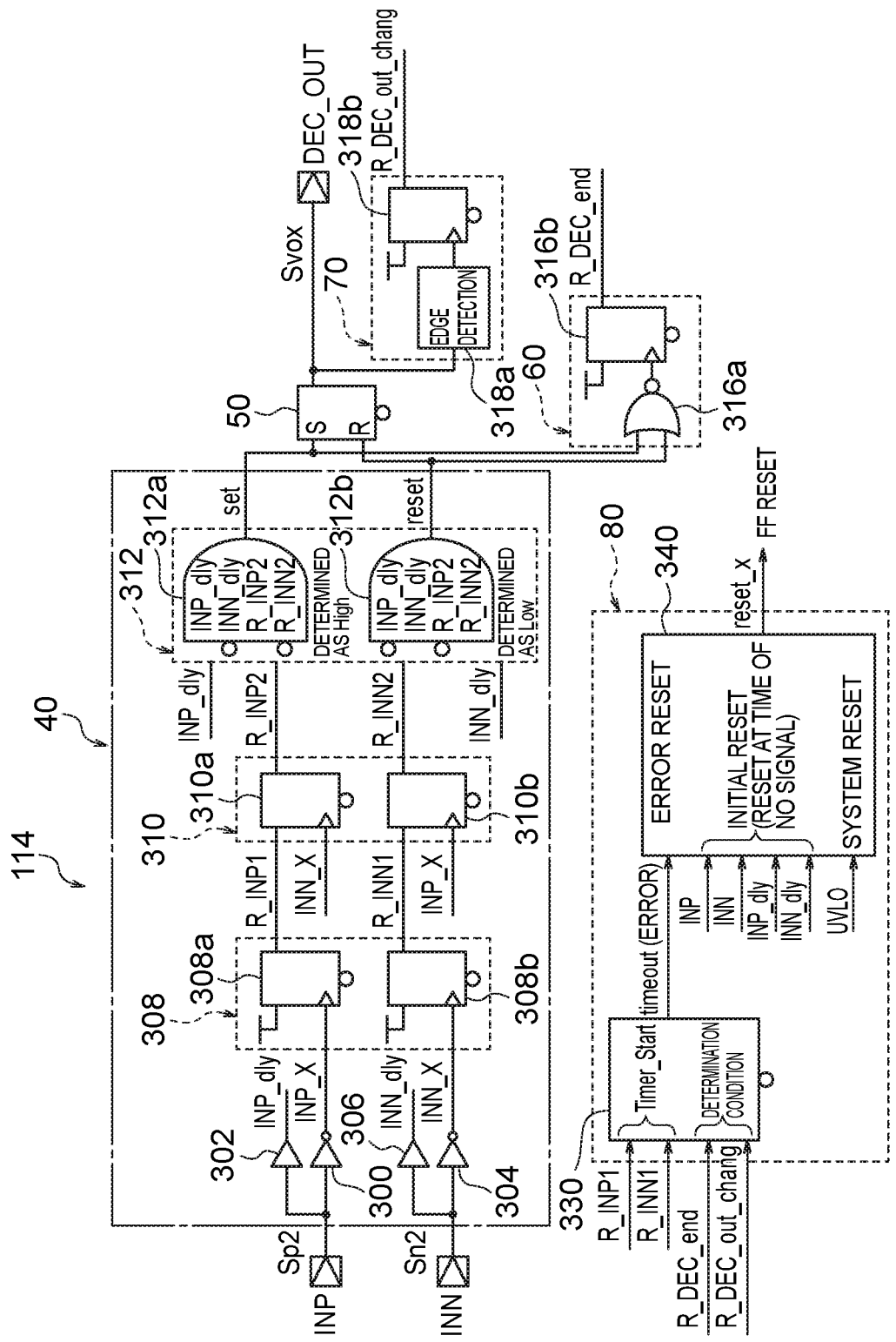
FIG. 13 is a diagram illustrating a configuration example of a decoder.
Figure 14:
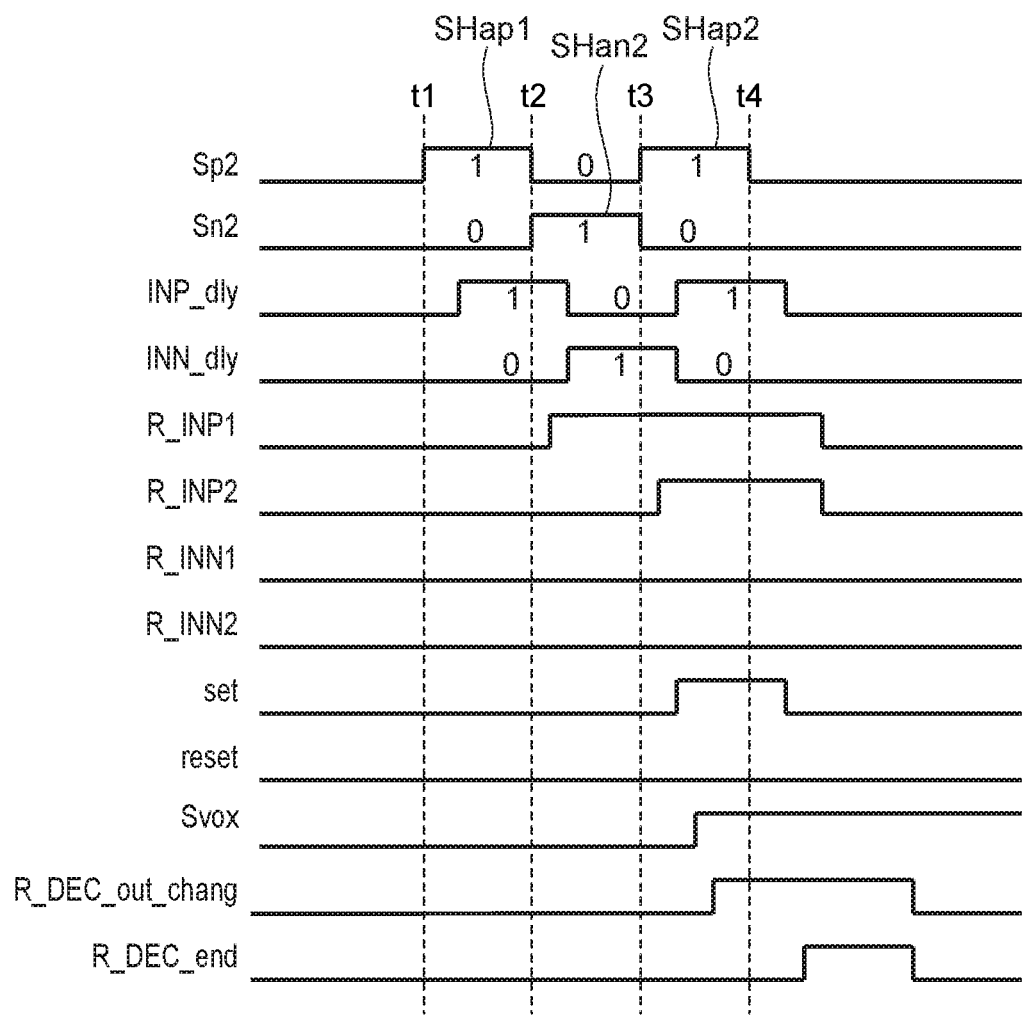
FIG. 14 is an explanatory diagram of an operation example of the decoder in a case in which third main pulse signals are input.
Figure 15:
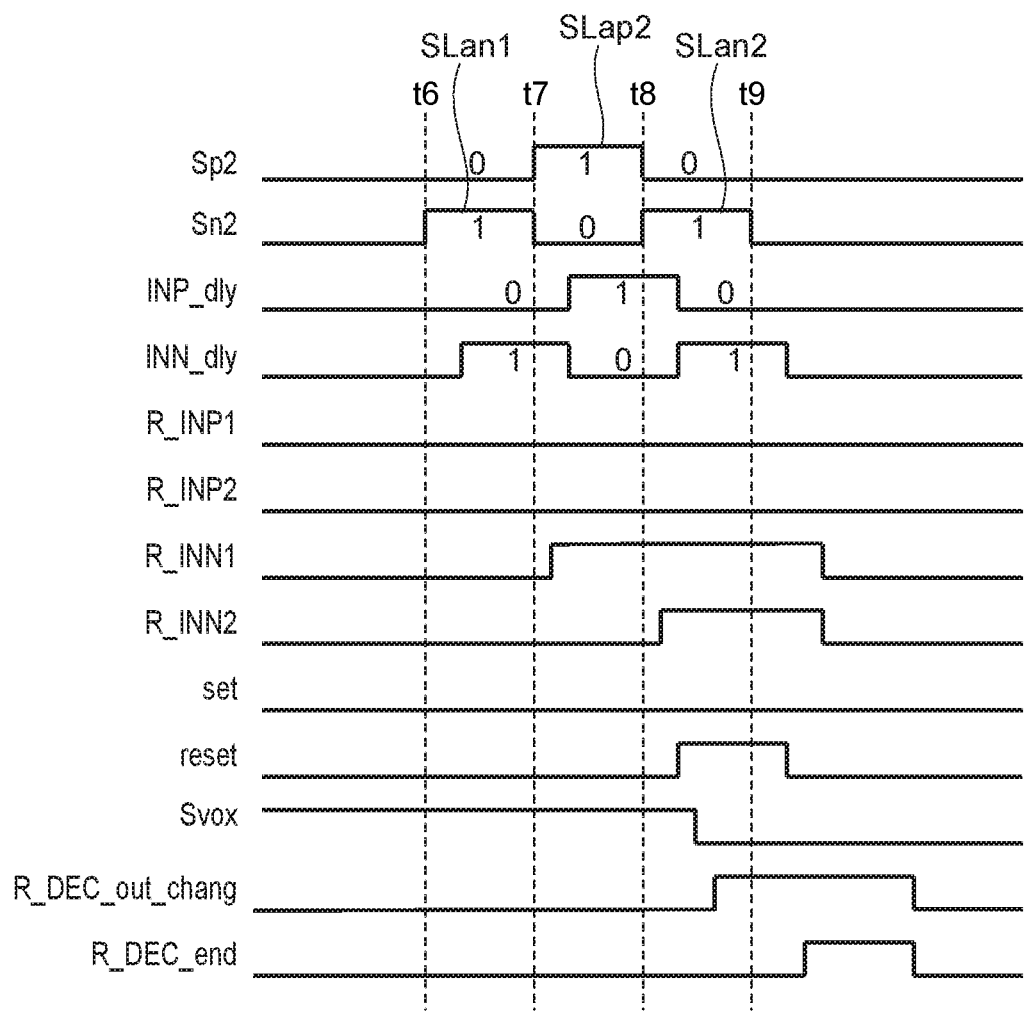
FIG. 15 is an explanatory diagram of an operation example of the decoder in a case in which fourth main pulse signals are input.

A configuration example of the decoder 114 is explained using FIGS. 13 to 15. FIG. 13 is a diagram illustrating a configuration example of the decoder 114. The decoder 114 includes a decoding circuit 40, a signal holding circuit 50, a plurality of detection circuits 60 and 70, and a reset circuit 80. Terminals INP, INN, DEC_OUT are further illustrated in FIG. 13.

The decoding circuit 40 outputs a first signal pair (set=1, reset=0) as predetermined signals each time any of the third main pulse signals SHap1, SHan2, and SHap2 and the third sub pulse signals Shap1, Shan2, and Shap2 is input. Further, the decoding circuit 40 outputs a second signal pair (set=0, reset=1) as predetermined signals each time any of the fourth main pulse signals SLan1, SLap2, and SLan2 and the fourth sub pulse signals Slan1, Slap2, and Slan2 is input.

The signal holding circuit 50 is, for example, an RS flip-flop circuit being a sequential circuit. The signal holding circuit 50 outputs a high-level signal (1), for example, when receiving the first signal pair (set=1, reset=0) and outputs a low-level signal (0), for example, when receiving the second signal pair (set=0, reset=1). For example, when receiving a third signal pair (set=0, reset=0), the signal holding circuit 50 holds the signal value.

The detection circuit (DECODE completion timing detection circuit) 60 detects a completion timing of decoding of the decoding circuit 40. That is, the detection circuit 60 detects whether any of the main pulse signals and the sub pulse signals has been input. For example, when the input signal is changed from the third signal pair (set=0, reset=0) to the first signal pair (set=1, reset=0) or the second signal pair (set=0, reset=1) in the detection circuit 60, a nor circuit 316a changes the output signal from a high-level signal to a low-level signal. Accordingly, a flip-flop 316b outputs a high-level signal (1) when any of the main pulse signals and the sub pulse signals is input. The flip-flop 316b outputs a low-level signal (0) when reset.

The detection circuit 70 (output inversion detection circuit) 70 detects output inversion. That is, the detection circuit 70 detects inversion of the output value of the signal holding circuit 50. An edge detection circuit 318a changes the output from a high-level signal to a low-level signal when different level signals are input in chronological order. Accordingly, a flip-flop 318b outputs a high-level signal (1) when the output value of the signal holding circuit 50 is inverted. The flip-flop 318b outputs a low-level signal (0) when reset. The detection circuit 70 does not detect output inversion in a signal holding operation for the sub pulse signals of the signal holding circuit 50.

The reset circuit 80 includes a condition determining circuit 330 and a reset output circuit 340. The reset circuit 80 performs initial reset of flip-flops 308a, 308b, 310a, and 310b to, for example, a low-level signal (0) according to detection results of the detection circuits 60 and 70, or the like.

The condition determining circuit 330 outputs an error signal to the reset output circuit 340, for example, when the high-level signals (1) are input as the determination results of the detection circuits 60 and 70. This causes the reset output circuit 340 to reset the flip-flops 308a, 308b, 310a, and 310b to the low-level signal (0).

When a signal R_INP1 or a signal R_INN1 becomes a high-level signal (1), the condition determining circuit 330 outputs an error signal to the reset output circuit 340 a predetermined time later. This causes the reset output circuit 340 to reset the flip-flops 308a, 308b, 310a, and 310b to the low-level signal (0). Accordingly, the flip-flops 308a, 308b, 310a, and 310b can be reset also when the signals of the detection circuits 60 and 70 are not input yet.

The reset output circuit 340 also resets the flip-flops 308a, 308b, 310a, and 310b to the low-level signal (0) on the basis of a signal INP_X, a signal INP_dly, a signal INN_X, and a signal INN_dly at the time of no signal. This enables the flip-flops 308a, 308b, 310a, and 310b to be repeatedly reset even when the signals of the detection circuits 60 and 70 are not input yet.

The reset output circuit 340 resets the flip-flops 308a, 308b, 310a, 310b, 316b, and 318b to the low-level signal (0) when a system signal UVLO is input as another signal. Accordingly, the flip-flops 308a, 308b, 310a, 310b, 316b, and 318b can be reset according to the system signal UVLO of an upper-order device.

More specifically, the decoding circuit 40 includes a plurality of buffer circuits 302 and 306, a plurality of Not circuits 300 and 304, a first pulse detection circuit 308, a second pulse detection circuit 310, and a determining circuit 312.

The first pulse detection circuit 308 is, for example, a first flip-flop group and includes the first flip-flops 308a and 308b. The first pulse detection circuit 308 detects a first pulse of, for example, the third main pulse signals SHap1, SHan2, and SHap2, the third sub pulse signals Shap1, Shan2, and Shap2, the fourth main pulse signals SLan1, SLap2, and SLan2, and the fourth sub pulse signals Slan1, Slap2, and Slan2. That is, the first pulse detection circuit 308 detects the pulse signals SHap1, Shap1, SLan1, and Slan1.

The second pulse detection circuit 310 is, for example, a second flip-flop group and includes the second flip-flops 310a and 310b. The second pulse detection circuit 310 detects a second pulse of, for example, the third main pulse signals SHap1, SHan2, and SHap2, the third sub pulse signals Shap1, Shan2, and Shap2, the fourth main pulse signals SLan1, SLap2, and SLan2, and the fourth sub pulse signals Slan1, Slap2, and Slan2. That is, the second pulse detection circuit 310 detects the pulse signals SHan2, Shan2, SLap2, and Slap2. The determining circuit 312 includes a plurality of logic circuits 312a and 312b.

The Not circuit 300 delays a signal input from the terminal INP by Δt and invertedly outputs the delayed signal as the signal INP_X to a clock terminal of the first flip-flop 308a. The buffer circuit 302 delays the signal input from the terminal INP by Δt and outputs the delayed signal as the signal INP_dly to the determining circuit 312. Similarly, the Not circuit 304 delays a signal input from the terminal INN by Δt and invertedly outputs the delayed signal as the signal INN_X to a clock terminal of the first flip-flop 308b. The buffer circuit 306 delays the signal input from the terminal INN by Δt and outputs the delayed signal as the signal INN_dly to the determining circuit 312.

The first flip-flops 308a and 308b and the second flip-flops 310a and 310b are, for example, D flip-flops and a high-level signal is always input to D terminals of the first flip-flops 308a and 308b. When the high-level signal (1) is input as a reset input, a low-level signal (0) is output.

An operation example of the decoder 114 in a case in which the third main pulse signals SHap1, SHan2, and SHap2 are input is first explained using FIG. 14 and with reference to FIG. 13. FIG. 14 is an explanatory diagram of an operation example of the decoder 114 in the case in which the third main pulse signals SHap1, SHan2, and SHap2 are input. Signals in FIG. 14 correspond to the signals in FIG. 13, respectively. The horizontal axis represents a time.

As illustrated in FIG. 14, the first flip-flop 308a of the first pulse detection circuit 308 first receives the third main pulse signal SHap1 as an input from the side of the terminal INP at a timing t1, changes the signal R_INP1 from the low-level signal (0) to the high-level signal (1) in response to a timing t2 when the third main pulse signal SHap1 changes from the high-level signal (1) to the low-level signal (0), and inputs the signal R_INP1 to the D terminal of the second flip-flop 310a of the second pulse detection circuit 310. That is, the first flip-flop 308a changes the signal R_INP1 from the low-level signal (0) to the high-level signal (1) in response to the timing t2 when the signal INP_X changes from the low-level signal (0) to the high-level signal (1).

Next, the second flip-flop 310a receives the third main pulse signal SHan2 as an input from the side of the terminal INN at the timing t2, changes the signal R_INP2 from the low-level signal (0) to the high-level signal (1) in response to a timing t3 when the third main pulse signal SHan2 changes from the high-level signal (1) to the low-level signal (0), and outputs the signal R_INP2 to the determining circuit 312. That is, the second flip-flop 310a changes the signal R_INP2 from the low-level signal (0) to the high-level signal (1) in response to the timing t3 when the signal INN_X changes from the low-level signal (0) to the high-level signal (1).

Next, the logic circuit 312a of the determining circuit 312 brings the signal set to the high-level signal (1) at a timing when the signal INP_dly and the signal R_INP2 become the high-level signal (1) and the signal INN_dly and the signal R_INN2 become the low-level signal (0).

Meanwhile, the logic circuit 312b of the determining circuit 312 outputs a signal opposite to that of the logic circuit 312a. That is, the logic circuit 312b outputs a high-level signal (1) when the levels of the input signal group of the logic circuit 312a are all inverted in a case in which the logic circuit 312a outputs a high-level signal (1). Conversely, the logic circuit 312a outputs a high-level signal (1) when the levels of the input signal group of the logic circuit 312b are all inverted in a case in which the logic circuit 312b outputs a high-level signal (1). That is, the logic circuit 312b outputs a low-level signal (0) when the output of the logic circuit 312a is a high-level signal (1). This causes the signal holding circuit 50 to bring the signal Svox to a high-level signal (1) and maintain the high-level signal (1) because the signal set is a high-level signal (1) and the signal reset is a low-level signal (0).

When the signals Sp2, Sn2, INP_dly, and INN_dly are brought to a non-signal state, that is, become a low-level signal (0), the reset circuit 80 performs FF reset, whereby the flip-flops 308a, 308b, 310a, 316b, 318b, and 310b are reset to the low-level signal (0).

The detection circuit 70 changes an output signal R_DEC_out_chang from a low-level signal (0) to a high-level signal (1) in response to a timing when the signal Svox changes from the low-level signal (0) to the high-level signal (1).

The detection circuit 60 changes an output signal R_DEC_end from a low-level signal (0) to a high-level signal (1) in response to a timing when the signal set or the signal reset changes from the low-level signal (0) to the high-level signal (1). The same operation as in the case in which the third main pulse signals SHap1, SHan2, and SHap2 are input is performed also in a case in which the third sub pulse signals Shap1, Shan2, and Shap2 are input.

An operation example of the decoder 114 in a case in which the fourth main pulse signals SLan1, SLap2, and SLan2 are input is explained next using FIG. 15 and with reference to FIG. 13. FIG. 15 is an explanatory diagram of an operation example of the decoder 114 in a case in which the fourth main pulse signals SLan1, SLap2, and SLan2 are input. Signals in FIG. 15 correspond to the signals in FIG. 13, respectively. The horizontal axis represents a time.

As illustrated in FIG. 15, the first flip-flop 308b of the first pulse detection circuit 308 first receives the fourth main pulse signal SLan1 as an input from the side of the terminal INN at a timing t6, changes the signal R_INN1 from the low-level signal (0) to the high-level signal (1) in response to a timing t7 when the fourth main pulse signal SLan1 changes from the high-level signal (1) to the low-level signal (0), and inputs the signal R_INN1 to the D terminal of the second flip-flop 310b. That is, the first flip-flop 308b changes the signal R_INN1 from the low-level signal (0) to the high-level signal (1) in response to the timing t7 when the signal INN_X changes from the low-level signal (0) to the high-level signal (1).

Next, the second flip-flop 310b of the second pulse detection circuit 310 receives the fourth main pulse signal SLap2 as an input from the side of the terminal INP at the timing t7, changes the signal R_INN2 from the low-level signal (0) to the high-level signal (1) in response to a timing t8 when the fourth main pulse signal SLap2 changes from the high-level signal (1) to the low-level signal (0), and outputs the signal R_INN2 to the determining circuit 312. That is, the second flip-flop 310*b* changes the signal R_INN2 from the low-level signal (0) to the high-level signal (1) in response to the timing t8 when the signal INP_X changes from the low-level signal (0) to the high-level signal (1).

Next, the logic circuit 312*b* of the determining circuit 312 brings the signal reset to the high-level signal (1) at a timing when the signal INN_dly and the signal R_INN2 become the high-level signal (1) and the signal INP_dly and the signal R_INP2 become the low-level signal (0).

As described above, the logic circuit 312*a* outputs a low-level signal (0) when the output of the logic circuit 312*b* is a high-level signal (1). Accordingly, the signal holding circuit 50 brings the signal Svox to a low-level signal (0) and maintains the low-level signal (0) because the signal reset is a high-level signal (1) and the signal set is a low-level signal (0).

The detection circuit 70 changes the output signal R_DEC_out_chang from the low-level signal (0) to the high-level signal (1) in response to a timing when the signal Svox changes from the high-level signal (1) to the low-level signal (0).

The detection circuit 60 changes the output signal R_DEC_end from the low-level signal (0) to the high-level signal (1) in response to a timing when the signal set or the signal reset changes from the low-level signal (0) to the high-level signal (1). The same operation as in the case in which the fourth main pulse signals SLan1, SLap2, and SLan2 are input is performed also in a case in which the fourth sub pulse signals Slan1, Slap2, and Slan2 are input.

In this manner, the signal holding circuit 50 can maintain the output value independently of the reset operation to the flip-flops 308*a*, 308*b*, 310*a*, 310*b*, 316*b*, and 318*b* of the reset circuit 80. Therefore, even when the outputs of the flip-flops 308*a*, 308*b*, 310*a*, and 310*b* are erroneously inverted due to noise or the like between the third main pulse signals SHap1, SHan2, and SHap2 and the fourth main pulse signals SLan1, SLap2, and SLan2 in the state in which the output value of the signal holding circuit 50 is maintained, the outputs can be restored to correct values according to the third sub pulse signals Shap1, Shan2, and Shap2 or the fourth sub pulse signals Slan1, Slap2, and Slan2.

As described above, according to the present embodiment, the main pulse signal generation circuit 200 generates the first main pulse signals SHp1 and SHn2 in response to rising of the logic signal Svix and the second main pulse signals SLn1 and SLp2 in response to falling thereof, the sub pulse signal generation circuit 202 performs at least either a first generation process of generating the first sub pulse signals Shp1 and Shn2 corresponding to the first main pulse signals SHp1 and SHn2 at predetermined intervals (Trefresh+2T) after a predetermined time from the generation of the first main pulse signals SHp1 and SHn2, or a second generation process of generating the second sub pulse signals Sln1 and Slp2 corresponding to the second main pulse signals SLn1 and SLp2 at predetermined intervals (Trefresh+2T) after a predetermined time from the generation of the second main pulse signal SLn1 and SLp2, and the selection circuit (output circuit) 206 stops outputting of the sub pulse signals generated by the sub pulse signal generation circuit 202 in response to at least either rising or falling of the logic signal Svix. Accordingly, since the sub pulse signals Shp1, Shn2, Sln1, and Slp2 are stopped when at least either rising or falling of the logic signal Svix occurs during outputting of the sub pulse signals Shp1, Shn2, Sln1, and Slp2, the main pulse signal generation circuit 200 can generate the main pulse signals SHp1, SHn2, SLn1, and SLp2 immediately after the time Tx_Wait without waiting the end of the sub pulse signals Shp1, Shn2, Sln1, and Slp2 also when the sub pulse signals Shp1, Shn2, Sln1, and Slp2 and the main pulse signals SHp1, SHn2, SLn1, and SLp2 interfere with each other on the side of the receiving circuit 20.

The decoder 114 includes the flip-flops 308*a*, 308*b*, 310*a*, 310*b*, 316*b*, and 318*b* and sets predetermined values to the flip-flops 308*a*, 308*b*, 310*a*, 310*b*, 316*b*, and 318*b*, respectively, each time the third sub pulse signals Shap1, Shan2, and Shap2 corresponding to the first sub pulse signals Shp1 and Shn2 or the fourth sub pulse signals Slan1, Slap2, and Slan2 corresponding to the second sub pulse signals Sln1 and Slp2 are input. That is, when the third sub pulse signals Shap1, Shan2, and Shap2 or the fourth sub pulse signals Slan1, Slap2, and Slan2 are inserted, the decoder 114 sets the predetermined values to the flip-flops 308*a*, 308*b*, 310*a*, 310*b*, 316*b*, and 318*b*, respectively, in response to the sub pulse signals. This enables the outputs of the flip-flops 308*a*, 308*b*, 310*a*, 310*b*, 316*b*, and 318*b* to be restored to correct values even when the outputs are erroneously inverted due to noise or the like between the first main pulse signal SHp1 and SHn2 and the second main pulse signals SLn1 and SLp2. Therefore, an erroneous operation of the communication apparatus 1 can be suppressed.

The signal holding circuit 50 maintains the high-level signal even when any of the third main pulse signals SHap1, SHan2, and SHap2 and the third sub pulse signals Shap1, Shan2, and Shap2 is input, and maintains the low-level signal even when any of the fourth main pulse signals SLan1, SLap2, and SLan2 and the fourth sub pulse signals Slan1, Slap2, and Slan2 is input. Accordingly, the value of the output signal Svox corresponding to the logic signal Svix can be maintained even when the third sub pulse signals Shap1, Shan2, and Shap2 and the fourth sub pulse signals Slan1, Slap2, and Slan2 are input. Therefore, an erroneous operation of the communication apparatus 1 can be suppressed.

While certain embodiments have been described, these embodiments have been presented by way of example only, and are not intended to limit the scope of the inventions. Indeed, the novel embodiments described herein may be embodied in a variety of other forms and various omissions, substitutions, and changes may be made without departing from the spirit of the inventions. The embodiments and modifications thereof are included in the scope and the spirit of the invention and are also included in the inventions described in the claims and their equivalents.

The invention claimed is:

1. A communication apparatus comprising a transmitting circuit, wherein
the transmitting circuit includes an encoder, and
the encoder includes
a main pulse signal generation circuit configured to generate a first main pulse signal in response to rising of a logic signal, and a second main pulse signal in response to falling thereof,
a sub pulse signal generation circuit configured to perform at least either a first generation process of generating a first sub pulse signal corresponding to the first main pulse signal at predetermined intervals after a predetermined time from generation of the first main pulse signal, or a second generation process of generating a second sub pulse signal corresponding to the second main pulse signal at predetermined intervals after a predetermined time from generation of the second main pulse signal, and an output circuit configured to output at least any of the first main pulse signal, the second main pulse signal, the first sub pulse signal, and the second sub pulse signal, and the output circuit stops outputting at least either the first sub pulse signal or the second sub pulse signal.

2. The apparatus of claim 1, wherein the output circuit stops outputting at least either the first sub pulse signal or the second sub pulse signal in response to at least either the rising or the falling.

3. The apparatus of claim 1, wherein the first main pulse signal is a first combination of a plurality of pulse signals, and the second main pulse signal is a second combination of a plurality of pulse signals different from the first combination.

4. The apparatus of claim 3, further comprising a receiving circuit, wherein the receiving circuit includes a decoder, and the decoder generates a high-level signal in response to each of a third main pulse signal and a third sub pulse signal respectively corresponding to the first main pulse signal and the first sub pulse signal, and includes a signal holding circuit configured to output a high-level signal until either a fourth main pulse signal or a fourth sub pulse signal respectively corresponding to the second main pulse signal and the second sub pulse signal is input.

5. The apparatus of claim 4, wherein the decoder generates a low-level signal in response to each of the fourth main pulse signal and the fourth sub pulse signal, and the signal holding circuit outputs a low-level signal until either the third main pulse signal or the third sub pulse signal is input.

6. The apparatus of claim 5, wherein the first sub pulse signal is the first combination of a plurality of pulse signals, and the second sub pulse signal is the second combination of a plurality of pulse signals, and the decoder performs a refresh operation in response to the first sub pulse signal and the second sub pulse signal.

7. The apparatus of claim 6, wherein the decoder includes a first pulse detection circuit configured to output a predetermined signal in response to a first one of plural pulse signals included in the third main pulse signal, the third sub pulse signal, the fourth main pulse signal, and the fourth sub pulse signal, a second pulse detection circuit configured to output a predetermined signal in response to a second one of the plural pulse signals included in the third main pulse signal, the third sub pulse signal, the fourth main pulse signal, and the fourth sub pulse signal, at least based on the output signal of the first pulse detection circuit, a detection circuit configured to output a first signal corresponding to the rising and a second signal corresponding to the falling, at least based on the output signal of the second pulse detection signal, and a reset circuit configured to generate a reset signal to reset the first pulse detection circuit and the second pulse detection circuit to initial values, respectively, in response to a last one of plural pulse signals included in each of the third main pulse signal, the third sub pulse signal, the fourth main pulse signal, and the fourth sub pulse signal, and the signal holding circuit outputs the high-level signal or the low-level signal in response to the first signal and the second signal.

8. The apparatus of claim 4, further comprising an AC coupling element configured to transmit at least any of the first main pulse signal, the second main pulse signal, the first sub pulse signal, and the second sub pulse signal output by the output circuit to the receiving circuit.

9. The apparatus of claim 8, wherein the AC coupling element is either an isolation micro transformer or a micro capacitor, and the transmitting circuit and the receiving circuit are galvanically isolated by either the isolation micro transformer or the micro capacitor.

10. A semiconductor device comprising an encoder, wherein the encoder includes a main pulse signal generation circuit configured to generate a first main pulse signal in response to rising of a logic signal, and a second main pulse signal in response to falling thereof, a sub pulse signal generation circuit configured to perform at least either a first generation process of generating a first sub pulse signal corresponding to the first main pulse signal at predetermined intervals after a predetermined time from generation of the first main pulse signal, or a second generation process of generating a second sub pulse signal corresponding to the second main pulse signal at predetermined intervals after a predetermined time from generation of the second main pulse signal, and an output circuit configured to output at least any of the first main pulse signal, the second main pulse signal, the first sub pulse signal, and the second sub pulse signal, and the output circuit stops outputting at least either the first sub pulse signal or the second sub pulse signal.

11. The device of claim 10, wherein the output circuit stops outputting at least either the first sub pulse signal or the second sub pulse signal in response to at least either the rising or the falling.

12. The device of claim 10, wherein the first main pulse signal is a first combination of a plurality of pulse signals, and the second main pulse signal is a second combination of a plurality of pulse signals different from the first combination.

13. The device of claim 12, further comprising a receiving circuit, wherein the receiving circuit includes a decoder, and the decoder generates a high-level signal in response to each of a third main pulse signal and a third sub pulse signal respectively corresponding to the first main pulse signal and the first sub pulse signal, and includes a signal holding circuit configured to output a high-level signal until either a fourth main pulse signal or a fourth sub pulse signal respectively corresponding to the second main pulse signal and the second sub pulse signal is input.

14. The device of claim 13, wherein the decoder generates a low-level signal in response to each of the fourth main pulse signal and the fourth sub pulse signal, and the signal holding circuit outputs a low-level signal until either the third main pulse signal or the third sub pulse signal is input.

15. The device of claim 14, wherein
the first sub pulse signal is the first combination of a plurality of pulse signals, and the second sub pulse signal is the second combination of a plurality of pulse signals, and
the decoder performs a refresh operation in response to the first sub pulse signal and the second sub pulse signal.

16. The device of claim 15, wherein
the decoder includes
a first pulse detection circuit configured to output a predetermined signal in response to a first one of plural pulse signals included in the third main pulse signal, the third sub pulse signal, the fourth main pulse signal, and the fourth sub pulse signal,
a second pulse detection circuit configured to output a predetermined signal in response to a second one of the plural pulse signals included in the third main pulse signal, the third sub pulse signal, the fourth main pulse signal, and the fourth sub pulse signal, at least based on an output signal of the first pulse detection circuit,
a detection circuit configured to output a first signal corresponding to the rising and a second signal corresponding to the falling, at least based on an output signal of the second pulse detection signal, and
a reset circuit configured to generate a reset signal to reset the first pulse detection circuit and the second pulse detection circuit to initial values, respectively, in response to a last one of plural pulse signals included in each of the third main pulse signal, the third sub pulse signal, the fourth main pulse signal, and the fourth sub pulse signal, and
the signal holding circuit outputs the high-level signal or the low-level signal in response to the first signal and the second signal.

17. The device of claim 13, further comprising an AC coupling element configured to transmit at least any of the first main pulse signal, the second main pulse signal, the first sub pulse signal, and the second sub pulse signal output by the output circuit to the receiving circuit.

18. The device of claim 17, wherein
the AC coupling element is either an isolation micro transformer or a micro capacitor, and
the transmitting circuit and the receiving circuit are galvanically isolated by either the isolation micro transformer or the micro capacitor.

* * * * *